United States Patent [19]

Ito

[11] 4,163,261

[45] Jul. 31, 1979

[54] OVERLAP RECORDING DEVICE FOR SOUND CINECAMERA

[75] Inventor: Isami Ito, Suwa, Japan

[73] Assignee: Chinon Industries Incorporated, Suwa, Japan

[21] Appl. No.: 828,770

[22] Filed: Aug. 29, 1977

[30] Foreign Application Priority Data

Nov. 11, 1976 [JP] Japan .......................... 52-135556

[51] Int. Cl.² ........................................ G11B 27/02
[52] U.S. Cl. ........................................ 360/13; 360/74.1
[58] Field of Search ........................... 360/13, 67, 74

[56] References Cited

U.S. PATENT DOCUMENTS

| | | | |
|---|---|---|---|
| 2,797,264 | 6/1957 | Blaney | 360/13 |
| 3,190,969 | 6/1965 | Mattis | 360/13 |
| 3,476,885 | 11/1969 | Shiber et al. | 360/13 |
| 3,647,989 | 3/1972 | Mattas | 360/74 |
| 3,794,522 | 8/1976 | Fukatsu et al. | 360/74 |
| 3,952,330 | 4/1976 | Rimkus et al. | 360/74 |
| 3,968,518 | 7/1976 | Kihara et al. | 360/74 |
| 4,004,293 | 1/1977 | Osburn | 360/74 |
| 4,054,920 | 10/1977 | Kittag | 360/13 |

*Primary Examiner*—Vincent P. Canney
*Attorney, Agent, or Firm*—Blanchard, Flynn, Thiel, Boutell & Tanis

[57] ABSTRACT

A sound cinecamera is provided with a film feeding motor, an electric circuit for sound recording, an operating means, a controlling signal generating circuit for the purpose of generating, by receiving an instruction signal generated from said operating means, a sound record controlling signal during the time of film reverse-winding for overlap recording and reducing said controlling signal according to a predetermined time constant at the time of starting the film feeding operation again, a sound recoding signal control circuit for the purpose of controlling the level of recording signal in said sound recording circuit by receiving said controlling signal from said controlling signal generating circuit, and an AC biasing control circuit for the purpose of controlling the level of the AC biasing signal to said sound recording circuit by receiving said controlling signal from said controlling signal generating circuit.

8 Claims, 4 Drawing Figures

OVERLAP RECORDING DEVICE FOR SOUND CINECAMERA

BACKGROUND OF THE INVENTION

The present invention relates to an overlap recording device for a sound cinecamera, in particular a control device for use in overlap sound recording.

In making a film record of sound and image, overlap recording, namely, trick recording is effected through the process comprising recording the first sound and image, in succession reversely winding the recorded film by the amount needed, and thereafter lapping the second sound and image over the first sound and image. In this overlapped portion of sound and image, the first sound and image must disappear gradually into the state of the so-called fade-out, while the second sound and image must appear gradually into the state of the so-called fade-in. And in view of the time for said fade-out and fade-in in this trick recording being short, i.e., no more than several seconds, it is absolutely required to have exact control of the recording means in order to obtain superior fade-out and fade-in characteristics.

However, the conventional overlapping devices were defective in that aforesaid control was necessarily effected with exactness and so superior fade characteristics were obtained with extreme difficulty.

SUMMARY OF THE INVENTION

One object of the present invention is to provide an overlap recording device for a sound cinecamera which has eliminated the drawbacks inherent to the aforesaid conventional overlapping devices.

Another object of the present invention is to provide an overlap recording device for a sound cinecamera which is capable of providing exact control of the recording means, in particular, sound recording means.

A further object of the present invention is to provide an overlap recording device for a sound cinecamera which controls the film feeding motor and the sound recording control means by means of a logic circuit.

A still further object of the present invention is to provide an overlap recording device for a sound cinecamera wherein the time for controlling the fade-in and fade-out of sound is determined according to an electric time constant.

Another object of the present invention is to provide an overlap recording device for a sound cinecamera wherein the fade-in and fade-out of sound is effected by controlling the AC biasing signal together with the sound recording signal.

Other object of the present invention is to provide an overlap recording device for a sound cinecamera wherein the fade-out operation is effected not at the time of recording the first sound but at the time of recording a gradual fade-in of the second sound, by simultaneously eliminating the recorded first sound gradually into the fade-out state.

DETAILED DESCRIPTION OF THE INVENTION

Figure 1:
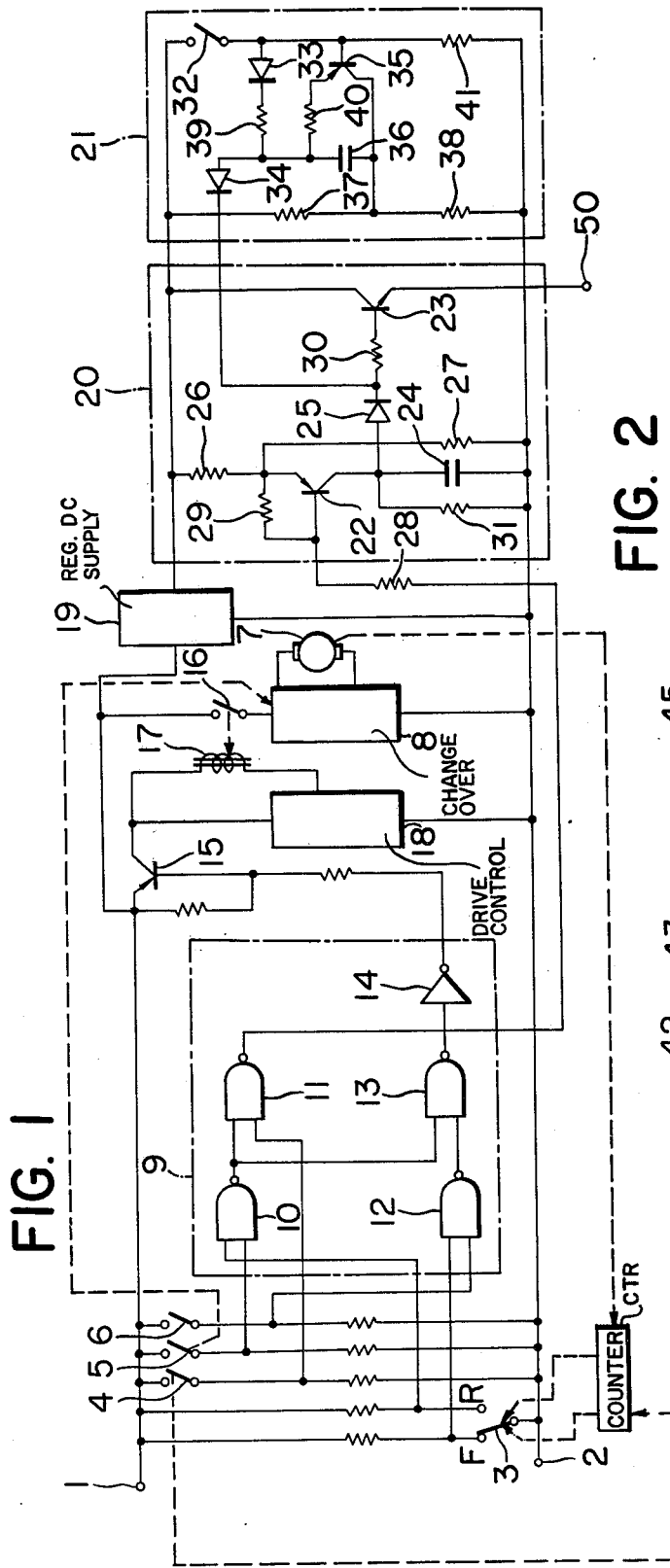
FIG. 1 is a view illustrative of the electric circuit of the essential part of one embodiment of the overlap recording device for a sound cinecamera according to the present invention in which a part of the circuit elements are blocked.

Hereinafter, explanation will be made of each circuit element shown in FIG. 1, by reference numeral.

The reference numerals 1 and 2 denote power source terminals, and electric power is supplied to each circuit through said terminals. And between these power source terminals 1 and 2 are juxtaposed a group of switches as referred to hereinafter. A counter switch 3 is of two position type, which in its normal state engages a forward contact F, but is shiftable to engage a reverse contact R during the reverse-winding of film for the overlap recording and, upon completion of the reverse-winding, is shiftable back to engage the contact F again. An overlap recording switch 4 is a switch to be operated by an operator when effecting the overlap recording. A release switch 5 is a switch which is operated by an operator, and is normally closed when a change-over circuit 8 for a film feeding motor 7 is in its regular state to thereby allow the film feeding motor 7 to make a regular rotation. A film reverse-winding switch 6 is utilized at the time of reverse-winding of film for the purpose of overlap recording, and is designed to be closed simultaneously with the release switch 5 being opened to thereby change the change-over circuit 8 to reverse state. The switch over of the foregoing counter switch 3 can be interlocked mechanically with a conventional overlap film counter CTR interlocking with the film feeding motor 7 when the overlap recording switch 4 closes.

A logic circuit 9 is a circuit to put out a drive signal for the film feeding motor 7 and an instruction signal for sound recording control at need by utilizing, as input, a signal from each of the aforesaid group of switches according to its opening or closing state. Logic circuit 9 is constructed by combining four dual input NAND gates 10, 11, 12 and 13 and an inverter 14. The inverter 14 puts out a drive signal as output to control a switching transistor 15 in the power feeding path from power source terminal 1.

Between the power source terminals 1 and 2 are also connected a film feeding motor 7 and the change-over circuit 8 thereof, both through a relay contact 16. A relay 17 having said contact 16 and a drive control circuit 18 thereof are connected across terminals 1 and 2 through the foregoing switching transistor 15. This drive control circuit 18 also functions for interval recording and single-frame shooting.

Furthermore, between the power source terminals 1 and 2 are connected a controlling signal generating circuit 20 and a manual controlling signal generating circuit 21, both through a regulated DC power supply circuit 19. This controlling signal generating circuit 20 is a circuit which functions to control the sound recording portion shown in FIG. 2 with an instruction signal for sound recording control put out from the logic circuit 9. Circuit 20 comprises a combination of a switching transistor 22, a control transistor 23, a condenser 24, a diode 25 and resistors 26, 27, 28, 29, 30 and 31. And said manual controlling signal generating circuit 21 comprises a combination of diodes 33 and 34, a transistor 35, a condenser 36 and resistors 37, 38, 39, 40 and 41 with a manual switch 32 which can be operated by an operator separately from the aforesaid switches.

Figure 2:
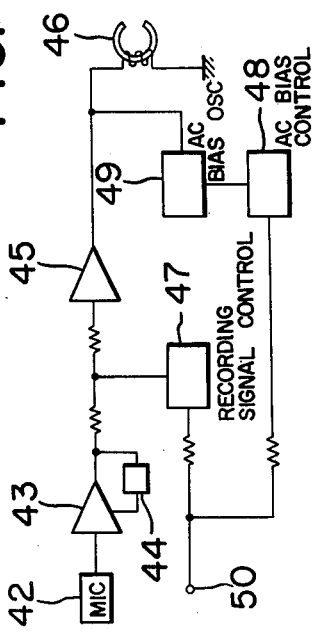
FIG. 2 is a block diagram of a further portion of said one embodiment of the recording circuit of the overlap recording device for a sound cinecamera according to the present invention, which is mutually connected with the circuit illustrated in FIG. 1 at the reference numeral 50.

In FIG. 2 the reference numeral 42 denotes a microphone, 43 denotes a preamplifier circuit with an auto level control circuit 44, 45 denotes a power amplifier circuit and 46 denotes a sound recording magnetic head, and each of these elements is connected successively to construct a sound recording circuit. And this sound recording circuit is combined with a sound recording signal control circuit 47, into which the output of the sound record controlling signal generating circuit 20 is put, and an AC biasing control circuit 48. The output of said sound recording signal control circuit 47 is transmitted to the output side of the preamplifier circuit 43. And the output of said AC biasing control circuit 48 controls an AC biasing oscillator circuit 49. The output (an AC bias) of said AC biasing oscillator circuit 49 is transmitted to the output side of the power amplifier circuit 45. The sound recording signal control circuit 47 and AC biasing control circuit 48 are controlled by the sound record controlling signal since the output of the aforesaid controlling signal generating circuit 20 is put in both circuits through a terminal 50.

Hereinafter, explanation will be made of the operation, of the recording device embodying the present invention.

To begin with, recording sound and image in a normal manner is effected by operating the release switch 5. In other words, when the release switch 5 is closed, the logic circuit 9 generates a drive signal of "L" (low or logic 0) level, under the condition where the counter switch 3 engages the contact F, whereby the switching transistor 15 is turned on. Accordingly, the drive control circuit 18 operates to energize the relay 17, whereby the relay contact 16 is closed and the film feeding motor 7 is actuated for regular forward rotation. Under this condition, the sound and image are recorded in a normal manner. The controlling signal generating circuit 20 is held in the state of being operable by the action of the regulated DC power supply circuit 19.

Next, to initiate overlap recording, the overlap recording switch 4 is closed. Due to this, the aforementioned overlap film counter CTR is actuated, and the counter switch 3 which interlocks said overlap film counter is thereby changed over to the contact R from the contact F after the lapse of several seconds. In succession thereto, the logic circuit 9 imparts a drive signal of "H" (high or logic 1) level to the switching transistor 15 so as to stop the film feeding motor 7, and simultaneously therewith, an instruction signal of "L" level is imparted to the switching transistor 22 from the NAND gate 11. Due to this, the switching transistor 15 is turned off to thus temporarily stop the film feeding motor 7, and at the same time the switching transistor 22 is turned on, whereby the charging of the condenser 24 is rapidly started. When the charged voltage of the condenser 24, determined by the voltage-dividing resistors 26 and 27, rapidly rises and attains a certain value, the control transistor 23 is turned on to put out a sound recording control signal. Owing to receipt of this control signal, the sound recording signal control circuit 47 and the AC biasing control circuit 48 rapidly lower the level of the sound recording signal at the output side of the amplifier circuit 43 and the level of the AC biasing signal from the AC biasing oscillator circuit 49 at the output side of the amplifier circuit 45 respectively. The rapid lowering of aforesaid signal levels allows the preparation for the film reverse-winding to be rapidly completed.

When the release switch 5 is opened and in concert therewith the film reverse-winding switch 6 is closed, the logic circuit 9 puts out a drive signal of "L" level, whereby the relay 17 is excited again and the film feeding motor 7 starts. On this occasion, however, as the change-over circuit 8 has been changed over to a reverse state simultaneously with the opening of release switch 5 and closing of the film reverse-winding switch 6, the motion of the film feeding motor 7 is reversed to feed the film backward. After a lapse of several seconds therefrom, the counter switch 3, by the action of the overlap film counter CTR interlocking therewith, is changed over so as to return to the contact F from the contact R, and accordingly the backward feeding of film comes to a halt automatically by a prescribed length.

Thereafter, when the release switch 5 is closed and the film reverse-winding switch 6 is opened in concert therewith, the film feeding motor 7 immediately starts rotating in normal (forward) direction. Simultaneously therewith, the switching transistor 22 of the controlling signal generating circuit 20 is released from the turned-on state and accordingly the condenser 24 discharges gradually according to the time constant determined by the resistor 31. During discharge of the condenser 24, the sound recording control signal put out on terminal 50 from the control transistor 23 gradually decreases, and the sound recording signal control circuit 47 and the AC biasing control circuit 48 gradually restore the levels of the sound recording signal and AC biasing signal to the former levels respectively so as to effect the fade-in thereof. Simultaneously, the already recorded sound gradually disappears so as to effect the fade-out thereof. After the lapse of several seconds determined according to said time constant, the aforesaid control signal on terminal 50 completely disappears, whereby the fade-in and fade-out complete and the normal recording state is restored. In this case, the overlap recording switch 4 interlocks with the overlap film counter CTR so as to be automatically opened thereby.

The aforesaid timing and performance characteristics of the overlap recording will be hereunder explained with reference to FIGS. 3 and 4.

Figure 3:
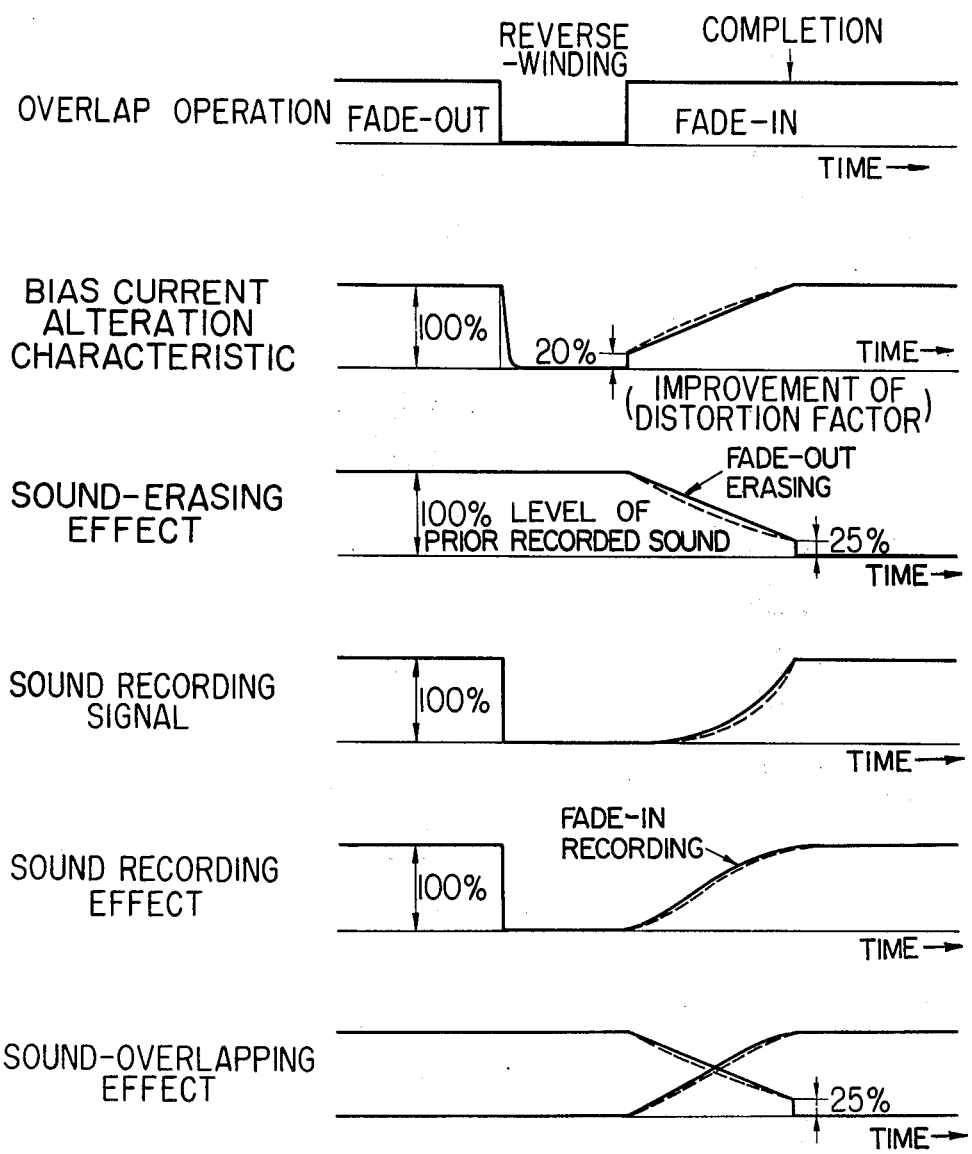
FIG. 3 is a timing chart illustrative of the timing of operation of the overlap recording device shown in FIGS. 1 and 2.
Figure 4:
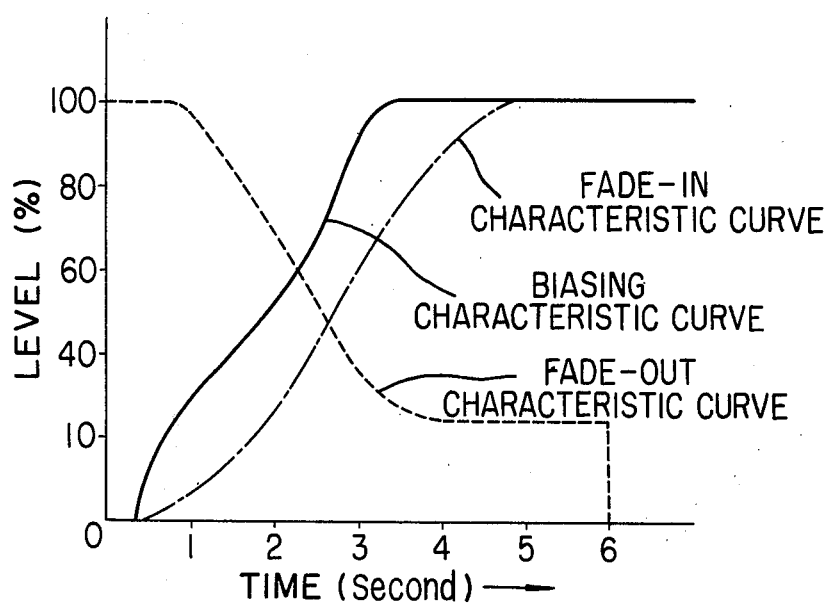
FIG. 4 is a graph illustrative of the performing characteristics of the overlap recording device shown in FIGS. 1 and 2.

In FIG. 3, in the fade-out section of the tape (intended for later overlap recording), normal recording performance is continued and there is no necessity of controlling the sound recording signal and bias current.

Then, at the start of the reversing time, said sound recording signal and bias current both rapidly disappear in order to prevent any further recording of sound.

This state is held throughout the reversing time, and in the succeeding fade-in time, the aforesaid sound recording signal and bias current are simultaneously and gradually restored. In other words, the value of bias current determines the effect of erasing a previously recorded sound, that is, the fade characteristics.

The influence of the bias current upon a sound recording signal to be newly recorded is substantially negligible, and therefore the fade-in characteristics of the sound recording signal can be set independently of the bias current.

Without relying on the overlap performance as discussed above, when the manual switch 32 is closed for the purpose of independently operating the fade-in and fade-out, the transistor 35 becomes disabled, the terminal voltage of the condenser 36 rises gradually up to the power source voltage according to the time constant determined with the co-operation of the resistor 39, and the sound is thus faded-out. When the manual switch 32 is opened under such conditions, the transistor 35 is turned on, the condenser 36 discharges gradually according to the time constant determined with the co-operation of the resistor 40, and thus the sound is faded-in.

As mentioned above, the overlap recording device for a sound cinecamera according to the present invention makes it possible to obtain the desired fade-out and fade-in characteristics, in particular, linear characteristics, because the sound recording levels of the sound signals to be recorded increase or decrease by the interaction of the sound recording signal control circuit and the AC biasing control circuit.

Furthermore, the overlap recording device according to the present invention permits a simplified composition of the circuit because the fade-out and fade-in are effected according to one common time constant, that of resistor 31 and capacitor 24.

Still further, because the logic circuit 9 employs, as input, the signals from the group of switches 3, 4, 5, 6 and puts out drive signals for the film feeding motor 7 and the instruction signals for the purpose of controlling the sound recording, the timing for each of these signals is exact and so exact control of overlap recording can be effected.

Although particular preferred embodiments of the invention have been disclosed in detail for illustrative purpose, it will be recognized that variations or modifications of the above disclosed apparatuses, including the arrangement of parts, lie within the scope of the present invention.

What is claimed is:

1. An overlap recording device for a sound cinecamera provided with a reversible, film feeding motor and an electric circuit for sound recording, said electric circuit having means for supplying a recording signal to be recorded and an AC recording bias current for erasing sounds previously recorded, said overlap recording device comprising:

operating means actuable for reversing and restoring forward motion of said motor, as well as for generating an instruction signal;

a controlling signal generating circuit means responsive to said instruction signal for (1) generating a sound record controlling signal during the time of film reverse-winding for overlap recording, and for (2) changing said controlling signal according to a predetermined time constant at the time of restarting forward film feeding by said film feeding motor;

a sound recording signal control circuit means responsive to said changing of said controlling signal for raising the level of said recording signal in said sound recording circuit in correspondence thereto;

AC bias control circuit means simultaneously responsive to said changing of said controlling signal for raising the level of said AC recording bias current to said sound recording circuit and correspondingly the erasing effect on a previously recorded sound, in correspondence thereto;

whereby fade-in recording of a sound is accompanied by simultaneous fade-out erasing of a prior recorded sound, both in response to said control signal.

2. An overlap recording device for a sound cinecamera provided with a reversible, film feeding motor and an electric circuit for sound recording, said electric circuit having means for supplying a recording signal to be recorded and an AC bias signal for erasing sounds previously recorded, said overlap recording device comprising:

operating means actuable for reversing and restoring forward motion of said motor, as well as for generating an instruction signal, said operating means comprising a logic circuit and a plurality of switches actuable for changing the output signal condition of said logic circuit, said switches including a release switch closable for normal recording, an overlap recording switch closable to produce said instruction signal, a reverse winding switch closable for reversing said motor, and a further switch actuable to a first position for causing said logic circuit to stop forward rotation of said motor and actuable to a second position for causing said logic circuit to stop reverse rotation of said motor, said logic circuit including means providing a drive signal to said film feeding motor, in addition to said instruction signal generated by said logic circuit;

a controlling signal generating circuit means responsive to said instruction signal for (1) generating a sound record controlling signal during the time of film reverse-winding for overlap recording, and for (2) changing said controlling signal according to a predetermined time constant at the time of restarting forward film feeding by said film feeding motor;

a sound recording signal control circuit means responsive to said changing of said control signal for raising the level of said recording signal in said sound recording circuit in correspondence thereto;

AC bias control circuit means simultaneously responsive to said changing of said control signal for raising the level of said AC bias signal to said sound recording circuit and correspondingly the erasing effect on a previously recorded sound, in correspondence thereto;

whereby fade-in recording of a sound is accompanied by simultaneous fade-out erasing of a prior recorded sound, both in response to said control signal.

3. The device of claim 2 in which said logic circuit comprises first and second gates each having an input connected to a corresponding position of said further switch, said first gate having further input connected to said overlap recording switch, said second gate having a further input connected to said reverse winding switch, a third gate having one input driven by the output of said first gate and a second input responsive to the position of said overlap recording switch, and a fourth gate having one input responsive to the output of said second gate and a remaining input responsive to the output of said first gate, said third gate having an output providing said instruction signal, said fourth gate having an output providing said motor drive signal.

4. The device of claim 3 including a pair of potential supply lines connected across a DC supply, a plurality of voltage dropping resistors each connecting a corresponding one of said release switch, said overlap recording switch, said reverse winding switch, said first position of said first switch and said second position of said further switch, in parallel, across said DC supply, said further switch having a movable contact shiftable between said first and second positions and being connected to one side of said DC supply, said overlap recording switch, release switch and reverse winding switch being connected to the other side of said DC supply.

5. An overlap recording device for a sound cinecamera provided with a reversible, film feeding motor and an electric circuit for sound recording, said electric circuit having means for supplying a recording signal to be recorded and an AC bias signal for erasing sounds previously recorded, said overlap recording device comprising:

operating means actuable for reversing and restoring forward motion of said motor, as well as for generating an instruction signal;

a controlling signal generating circuit means responsive to said instruction signal for (1) generating a sound record controlling signal during the time of film reverse-winding for overlap recording, and for (2) changing said controlling signal according to a predetermined time constant at the time of restarting forward film feeding by said film feeding motor, said controlling signal generating circuit means comprising a transistor switchable in response to said instruction signal, a time constant condenser rapidly chargable in response to said switching of said transistor, and means connected with said condenser for gradual discharge thereof, and a control transistor controlled by the voltage on said condenser for generating said controlling signal;

a sound recording signal control circuit means responsive to said changing of said control signal for raising the level of said recording signal in said sound recording circuit in correspondence thereto;

AC bias control circuit means simultaneously responsive to said changing of said control signal for raising the level of said AC bias signal to said sound recording circuit and correspondingly the erasing effect on a previously recorded sound, in correspondence thereto;

whereby fade-in recording of a sound is accompanied by simultaneous fade-out erasing of a prior recorded sound, both in response to said control signal.

6. An overlap recording device for a sound cinecamera provided with a reversible, film feeding motor and an electric circuit for sound recording, comprising:

an operating means including a release switch, a film reverse-winding switch arranged to be open while said release switch is closed, an overlap recording switch, a counter switch switchable by a film counter in turn actuable by said overlap recording switch, said operating means further including a logic circuit responsive to positioning of said switches for generating a drive signal for said film feeding motor and also for generating an instruction signal;

a controlling signal generating circuit responsive to said instruction signal for (1) generating a sound record controlling signal during the time of film reverse winding for overlap recording, and for (2) reducing said controlling signal according to a predetermined time constant at the time of restarting the film feeding operation of said film feeding motor;

a sound recording signal control circuit for controlling the level of recording signal in said sound recording circuit by receiving said controlling signal from said controlling signal generating circuit; and an AC biasing control circuit for controlling the level of the AC recording bias current to said sound recording circuit by receiving said controlling signal from said controlling signal generating circuit.

7. An overlap recording device for a sound cinecamera provided with a reversible, film feeding motor and an electric circuit for sound recording, comprising:

an operating means including a release switch, a film reverse-winding switch arranged to be open while said release switch is closed, an overlap recording switch, a counter switch switchable by a film counter in turn actuable by said overlap recording switch, said operating means further including a logic circuit responsive to positioning of said switches for generating a drive signal for said film feeding motor and also for generating an instruction signal;

a controlling signal generating circuit responsive to said instruction signal for (1) generating a sound record controlling signal during the time of film reverse winding for overlap recording, and for (2) reducing said controlling signal according to a predetermined time constant at the time of restarting the film feeding operation of said film feeding motor, said controlling signal generating circuit comprising a transistor to be switched by receiving said instruction signal, a time constant condenser to be rapidly charged at the time of switching of said transistor and devised to discharge gradually, and a control transistor controlled by the charged voltage on said condenser to generate said controlling signal;

a sound recording signal control circuit for controlling the level of recording signal in said sound recording circuit by receiving said controlling signal from said controlling signal generating circuit; and an AC biasing control circuit for controlling the level of the AC biasing signal to said sound recording circuit for receiving said controlling signal from said controlling signal generating circuit.

8. The device of claim 6 including means connecting said sound recording signal control circuit and said AC biasing control circuit between said controlling signal output of said controlling signal generating circuit and a recording-erase member disposed along the path of said film to record and erase sounds thereon, for respectively restoring the level of said sound recording signal and the level of said AC recording bias current gradually with the decrease of said controlling signal, so as to effect the fade-in of the sound, and simultaneously gradually erase the already recorded sound so as to effect the fade-out of the latter.

* * * * *

UNITED STATES PATENT AND TRADEMARK OFFICE
CERTIFICATE OF CORRECTION

PATENT NO. : 4 163 261
DATED : July 31, 1979
INVENTOR(S) : Isami Ito

It is certified that error appears in the above–identified patent and that said Letters Patent are hereby corrected as shown below:

Col. 8, line 51; change "for receiving" to ---by receiving---.

Signed and Sealed this

Fourth Day of December 1979

[SEAL]

Attest:

SIDNEY A. DIAMOND

Attesting Officer

Commissioner of Patents and Trademarks